(12) United States Patent
Vetterli

(10) Patent No.: US 7,294,266 B2
(45) Date of Patent: Nov. 13, 2007

(54) FILTER CARTRIDGE FOR A WATER TANK OF A COFFEE MACHINE

(75) Inventor: Heinz Vetterli, Wangen (CH)

(73) Assignee: SAECO IPR Limited (IE)

( * ) Notice: Subject to any disclaimer, the term of this patent is extended or adjusted under 35 U.S.C. 154(b) by 128 days.

(21) Appl. No.: 10/887,047

(22) Filed: Jul. 8, 2004

(65) Prior Publication Data

US 2005/0011824 A1    Jan. 20, 2005

(30) Foreign Application Priority Data

Jul. 17, 2003    (CH) .................................... 1249/03

(51) Int. Cl.
*B01D 27/02* (2006.01)
*B01D 24/04* (2006.01)
*B01D 24/18* (2006.01)

(52) U.S. Cl. ...................... 210/282; 210/283; 210/284; 210/286

(58) Field of Classification Search ................ 210/282, 210/283, 284, 286; 96/152
See application file for complete search history.

(56) References Cited

U.S. PATENT DOCUMENTS

| 417,070 | A |   | 12/1889 | Morris | ....................... 210/473 |
| 1,432,351 | A | * | 10/1922 | McGahan | ................... 210/284 |
| 2,369,915 | A | * | 2/1945 | Quinn | ........................ 210/232 |
| 4,946,485 | A | * | 8/1990 | Larsson | ....................... 96/152 |
| 5,076,922 | A |   | 12/1991 | DeAre | ......................... 210/282 |
| 5,785,848 | A | * | 7/1998 | Strand | ......................... 210/282 |
| 6,387,260 | B1 |   | 5/2002 | Pimenov et al. | ............ 210/282 |
| 6,582,595 | B1 | * | 6/2003 | Peabody | ..................... 210/190 |
| 6,860,992 | B2 | * | 3/2005 | Chau | ......................... 210/251 |

FOREIGN PATENT DOCUMENTS

DE           30 14 493        10/1981

* cited by examiner

*Primary Examiner*—Thomas M. Lithgow
(74) *Attorney, Agent, or Firm*—Maginot, Moore & Beck

(57) ABSTRACT

The filter cartridge for the water tank of a coffee machine comprises a housing having on both sides a plurality of slot-shaped openings constituting two inlets. For softening the water, the housing of the filter cartridge contains a ion exchange resin. The bottom of the housing comprises a central outlet. The interior of the housing is provided with a plurality of baffle members increasing the length of the flow path of the water between inlets and outlet. The housing comprises an upper portion and a lower portion, sealingly fixed to each other. The baffle members extend essentially in vertical direction and are alternately fixed to the upper and to the lower housing portion. Water passages are provided between the upper housing portion and the baffle members fixed to the lower housing portion, as well as between the lower housing portion and the baffle members fixed to the upper housing portion. The filter cartridge of the invention requires not much space, but offers high efficiency resulting from the long flowing path of the water through the ion exchange resin between inlets and outlet.

18 Claims, 2 Drawing Sheets

FILTER CARTRIDGE FOR A WATER TANK OF A COFFEE MACHINE

BACKGROUND OF THE INVENTION

The present invention refers to a filter cartridge for a water tank of a coffee machine, comprising a housing adapted to receive a filter medium and having at least one inlet located at the bottom of the filter cartridge and an outlet located at the bottom of the filter cartridge. A plurality of spaced apart baffle members are located in the interior of the housing and adapted to increase the length of the flow path of the water between the inlet and the outlet.

Such a filter cartridge serves for softening the water contained in the water tank of a coffee machine and used to brew a coffee beverage. As a medium for softening the water, for example a ion exchange resin can be used. As soon as the softening medium is exhausted, i.e. shows less and less softening effect, the filter cartridge should be replaced.

PRIOR ART

The German Patent Publication DE 197 17 054 discloses a water tank having a filter cartridge of the kind referred to herein. The filter cartridge, exchangably located in the interior of the water tank, is of generally cylindrical shape and comprises a water inlet at its bottom. From this inlet, a chamber extends upwards, constituting a passage for the water. Moreover, in the interior of the filter cartridge, there is provided a central conduit from the top of the cartridge to its bottom, leading to the outlet of the filter cartridge. By this design, it should be ensured that the water flows in upstream, i.e. from the bottom to the top, through the chamber containing the filter medium in order to avoid a compacting of the filter bed, resulting in an increased filter resistance, and the formation of channels.

The Patent Document EP 956129; discloses an apparatus for cleaning a fluid, comprising several cylindrical cartridges. According to the embodiment shown in FIG. 1 of that document, representing the prior art in those times, four cartridges are combined to a cartridge unit by means of a pair of plates. The pair of plates is provided with transfer channels through which the individual cartridges are hydraulically coupled in such a way that the water flows from the inlet successively through the four cartridges to the outlet. Both the inlet and the outlet are located at the top. Furthermore, embodiments are disclosed in this document in which the water flows through the particular cartridge always in the same direction, i.e. from top to bottom.

The German Patent Document DE 30 14 493 A1 discloses a filter coffee machine with a water tank, comprising a filter cartridge located on the bottom of the water tank. The outer shape of the filter cartridge is adapted to the particular water tank in which it is used and filled with a filter medium consisting of a ion exchange resin, active coal particles and germicidal additives. In some of the disclosed embodiments of the filter cartridge, baffle members are shown that are located between inlet and outlet to increase the dwell time of the water in the filter cartridge. However, in all these embodiments, the baffle members extend in horizontal direction, resulting in the danger of bed formation and bed compacting with increased flow resistance and formation of channels. All this finally leads to a decreased efficiency as far as the usage of the filter medium received in the filter cartridge is concerned. Moreover, in all embodiments, the inlet is located at the top of the filter cartridge. Amongst else, this fact has the disadvantage that the water tank can be completely emptied only if the shape of the filter cartridge exactly matches the shape of the water tank such that no dead spaces are present between the outside of the filter cartridge and the inside of the water tank.

The Patent Document US Pat. No. 417,070 A discloses a filter having in its interior vertically running baffle members for increasing the length of the water flow. In this case, again, the inlet is located at the top of the filter, resulting in the disadvantages discussed herein above. Additionally, out of the three flow paths the water has to run through along its way from the inlet to the outlet, two of them are flown through from top to bottom.

Finally, the Patent Document U.S. Pat. No. 6,387,260 B1 discloses a filter apparatus for cleaning fluids. The filter apparatus comprises a main jar into which a container is inserted from the top of the main jar. The bottom of the container is provided with a recess receiving a filter cartridge. The cylindrically shaped filter cartridge comprises a central, tube-shaped conduit, the upper end thereof opening into a hollow chamber. The bottom of the filter cartridge is provided with apertures through which the fluid to be cleaned flows into the filter cartridge. The water to be cleaned is filled into the container. As soon as the water filled into the container has reached a certain level in which the fluid level is above the hollow chamber of the filter cartridge, the cleaning process starts, following the laws of physics, by the fact that the water flows through the filter cartridge, leaves the latter one through the central, tube-shaped conduit and flows thereafter downwards into the main jar. Thereby, water continuously flows into the filter cartridge until the upper container is empty and the main jar is filled with the cleaned water.

OBJECTS OF THE INVENTION

On the basis of the prior art constituted by the German Patent Publication DE 30 14 493 A, it is an object of the present invention to provide an improved filter cartridge having an increased efficiency while simultaneously maintaining a comparatively small size by optimally utilizing the filter medium contained in the filter cartridge.

It is a further object of the invention to provide an improved filter cartridge in which bed formations and bed compacting in the interior of the cartridge are avoided.

It is a further object of the invention to provide an improved filter cartridge which, when inserted into a water tank, does not considerably decrease the usable water volume of the water tank.

SUMMARY OF THE INVENTION

To meet these and other object, the present invention provides a filter cartridge for a water tank of a coffee machine, comprising a housing adapted to receive a filter medium and having at least one inlet located at the bottom of the filter cartridge and an outlet located at the bottom of the filter cartridge.

A plurality of spaced apart baffle members are located in the interior of the housing and adapted to increase the length of the flow path of the water between the inlet and the outlet.

The housing comprises an upper housing portion and a lower housing portion. The baffle members are fixed alternately to the upper housing portion and the lower housing portion and extend essentially in vertical direction.

A first plurality of water flow passages is provided between the upper housing portion and the baffle members fixed to the lower housing portion, and a second plurality of water flow passages is provided between the lower housing portion and the baffle members fixed to the upper housing portion.

Due to the facts that the baffle members extend essentially vertically and are alternately fixed to the upper portion of the housing and the lower portion of the housing, and further due to the fact that water passages are provided between each baffle member and the upper and lower housing portion, respectively, the danger of bed formation and bed compacting is essentially avoided. The provision of the inlet at the bottom of the filter cartridge brings along the further advantage that the water flows through the first chamber, limited by the respective baffle member, from bottom to top and that essentially the entire interior of the water tank, into which the filter cartridge is inserted, can be utilized.

BRIEF DESCRIPTION OF THE DRAWINGS

In the following, an embodiment of the filter cartridge according to the invention will be further described, with reference to the accompanying drawings, in which.

DETAILED DESCRIPTION OF A PREFERRED EMBODIMENT

Figure 1:
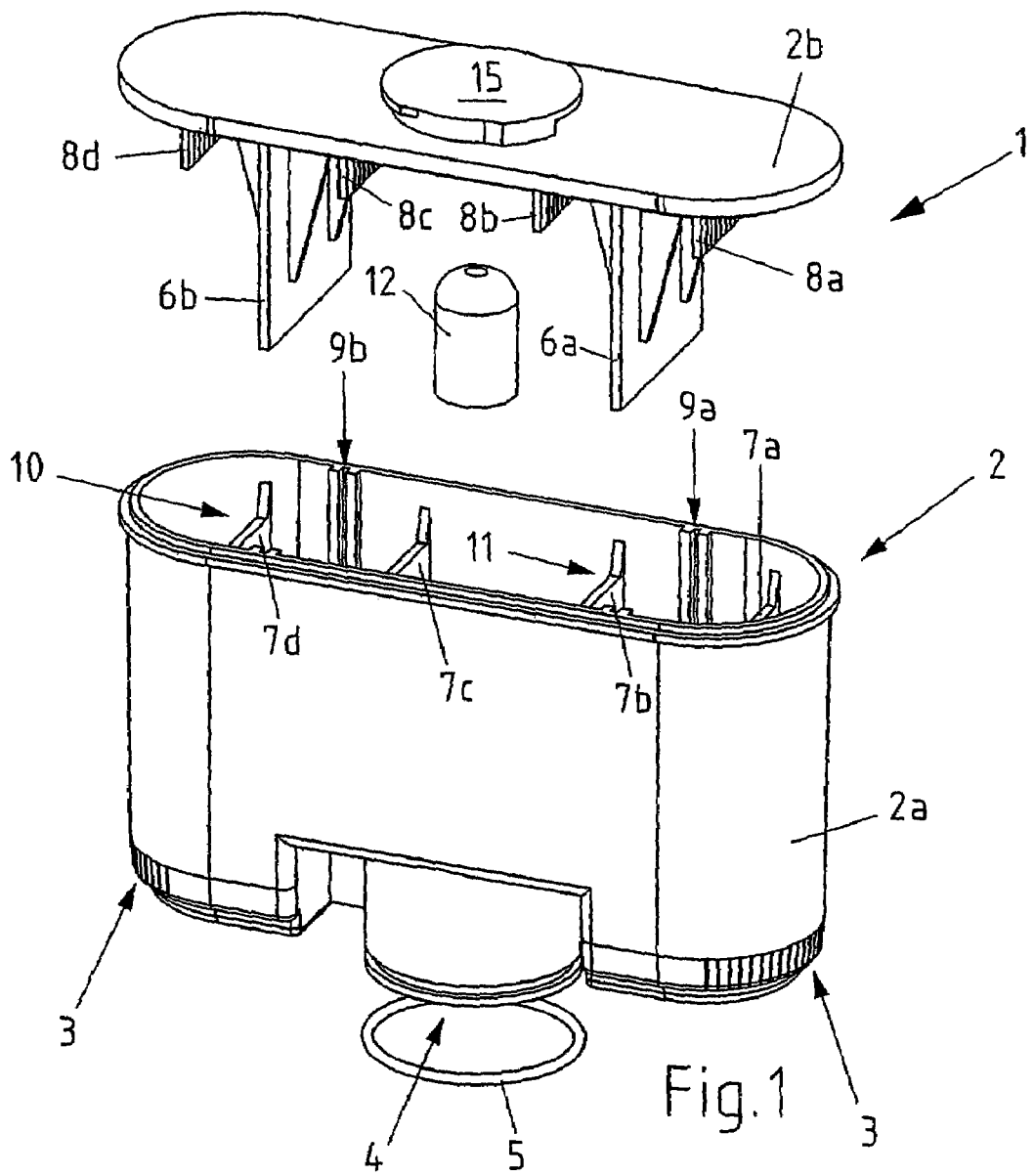
FIG. 1 shows a perspective view of the filter cartridge with its upper portion lifted upwards.
Figure 2:
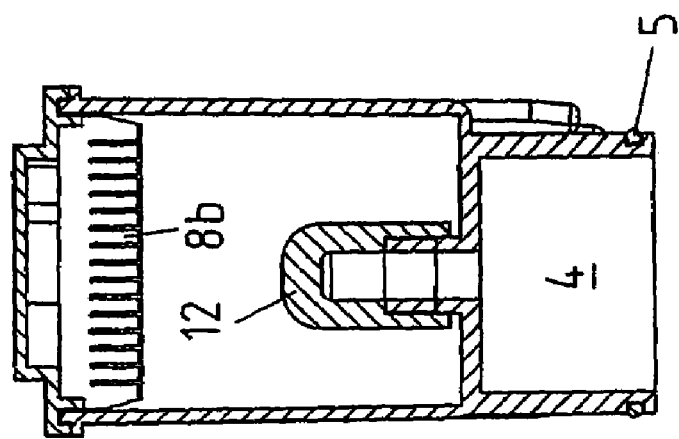
FIG. 2 shows a cross sectional view of the filter cartridge shown in FIG. 1; and, FIG. 3 shows a longitudinal sectional view of the filter cartridge shown in FIG. 1.

The filter cartridge, designated in its entirety with reference numeral 1, is adapted to be inserted into the water tank of a coffee machine, whereby neither the coffee machine nor its water tank are shown in the drawings. FIG. 1 shows the filter cartridge in a perspective view, while FIG. 2 shows a cross sectional view and FIG. 3 a longitudinal sectional view of the filter cartridge.

The filter cartridge 1 comprises a housing 2, having a lower portion 2a and an upper portion 2b. The upper portion 2b, shown in FIG. 1 somewhat lifted upwards with regards to the lower portion 2a, is sealingly fixed to the lower portion 2a during initial assembly, preferably by gluing or welding. It is understood that also releasable connections like snap-on connections, screw-on connections or similar ones would be possible. The lower portion 2a of the housing 2 comprises a plurality of lateral inlets 3, having the shape of slot-like cutouts and being located on both lateral head surfaces. Centrally located at the bottom of the lower portion 2a of the housing 2, there is provided a cylindrical outlet 4. The outlet 4 can be provided with a check valve (not shown) that is opened upon inserting the filter cartridge 1 into the water tank (not shown). In order to prevent dirt particles as well as the ion exchange resin present in the form of granules (not shown) from escaping the filter cartridge 1, the outlet 4 is provided with a filter element 12 made of a porous material. Moreover, there is provided an O-ring gasket 5, located at the outside of the outlet 4, ensuring a tight connection between the water outlet of the water tank (nor shown) and the filter cartridge 1.

Both the upper portion 2b of the housing 2 and the lower portion 2a of the housing 2 are provided with a plurality of baffle members 6a, 6b; 7a, 7b, 7c, 7d in the shape of partition walls. These baffle members 6a, 6b; 7a, 7b, 7c, 7d extend over the entire interior width of the housing 2 and form a plurality of chambers. The baffle members 7a, 7b, 7c, 7d provided at the lower portion 2a of the housing 2 do not fully extend up to the top of the lower portion 2a of the housing 2, with the result that in each case a gap 10, 11 remains through which water can flow from one chamber, passing the particular baffle member 7b, 7d, to an adjacent chamber of the filter cartridge 1. The baffle members 6a, 6b provided on the upper housing portion 2b are dimensioned such that they do not fully extend to the bottom of the lower housing portion 2a once the upper housing portion 2b is fixed to the lower housing portion 2a; the result is that in each case a gap remains through which water can flow from one chamber, passing the particular baffle member 6a, 6b, to an adjacent chamber of the filter cartridge 1.

The sidewalls of the lower housing portion 2a are provided with grooves 9a, 9b that are adapted to receive and guide the particular baffle members 6a and 6b, respectively, provided on the upper housing portion 2b. In particular, these grooves 9a, 9b also ensure that the baffle members 6a, 6b are laterally sealed, thus avoiding a hydraulic short circuit in which water could flow laterally past the baffle members 6a, 6b, thus reducing the effect of the filter cartridge 1.

Water entering the filter cartridge 1 through the lateral inlets 3 flows through the first chamber from bottom to top, then enters the second chamber and flows through it from top to bottom; in the third chamber, the water flow again is from bottom to top, while the central, forth chamber opening into the outlet 4 is passed by the water flow from top to bottom again. Thus, out of the four chambers through which water flows from the particular inlet 3 to the outlet 4, two chambers show an upstream flow of water and the remaining two show a downstream flow of water. By the provision of totally six baffle members 6a, 6b; 7a, 7b, 7c, 7d, the interior of the filter cartridge 1 is subdivided into seven chambers. Thus, the water flowing from the two lateral inlets 3 to the central outlet 4 has to flow along a relatively long path in the interior of the filter cartridge 1. By this design, the dwell time of the water in the interior of the filter cartridge 1 is relatively long; thus, the formation of so-called beds in the filter material can be avoided, resulting in an optimal utilization of the ion exchange resin contained in the filter cartridge and in an optimal efficiency as far as the water softening is concerned.

Figure 3:
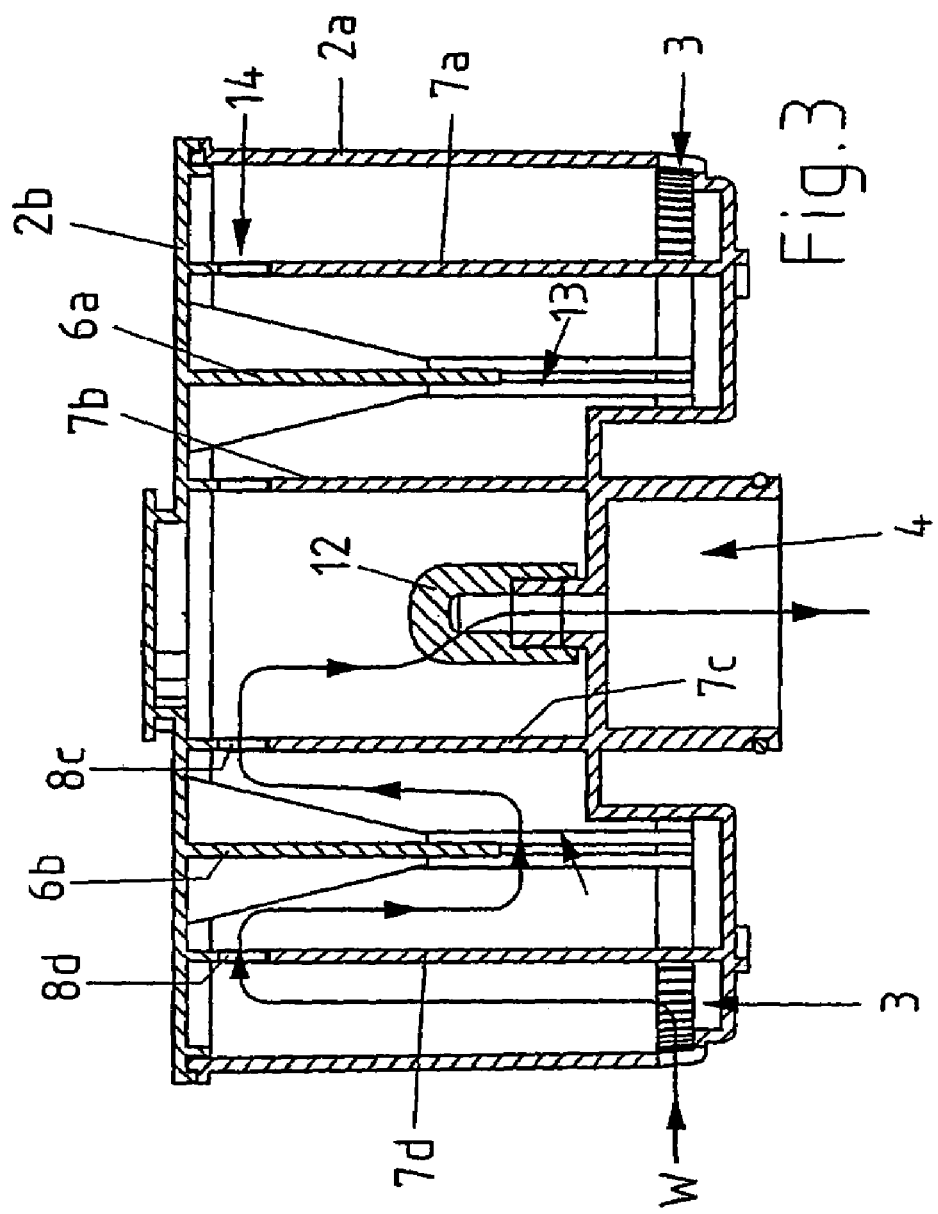

The flow of the water in the interior of the filter cartridge 1 from the left inlet (FIG. 3) to the central outlet 4 is indicated in FIG. 3 by a line W provided with arrows. Due to the fact that the inlets 3 are provided at the bottom of the filter cartridge 1, the water tank (not shown) can be essentially fully emptied through the filter cartridge 1, even in the case when the shape of the filter cartridge is not adapted to the shape of the water tank to be used. Moreover, using a filter cartridge 1 according to the invention does not substantially reduce the usable interior volume of a water tank.

It is understood that the number, design and orientation of the baffle members 6a, 6b; 7a, 7b, 7c, 7d may differ from the embodiment shown in the drawings and described herein before.

Prior to fixing the upper housing portion 2b, the interior of the filter cartridge 1 is filled with granules of a ion exchange resin, used for softening the water, essentially up to the upper edge of the baffle members 7a, 7b, 7c, 7d located on the lower housing member 2a. In order to prevent ion exchange resin granules to move through the slot-shaped openings 10, 11 from one chamber of the filter cartridge into an adjacent one, the upper housing portion 2b is provided with water permeable barrier members in the form of rakes 8a, 8b, 8c, 8d. These rakes 8a, 8b, 8c, 8d extend toward the upper edge of the baffle members 7a, 7b, 7c, 7d provided on the lower housing portion 2a into the slot shaped openings 10, 11 once the upper housing portion 2b is fixed to the lower housing portion 2a. Preferably, a small gap is left between the upper edges of the particular baffle members 7a, 7b, 7c, 7d and the lower end of the rakes 8a, 8b, 8c, 8d through which water can flow, but resin granules cannot move. On of the rakes (8*b*) is shown in the cross sectional view of FIG. 2.

Both the effective width of the slot-like cutouts constituting the lateral inlets 3 and the width of the gaps in the rakes 8*a*, 8*b*, 8*c*, 8*d* are chosen such that they are smaller than the statistical mean outer diameter of a resin granule, preferably smaller than x minus σ, whereby x is the arithmetic mean value of the granule diameter and σ is the standard deviation. By such a design, it is assured that the resin granules neither can escape through the slot-shaped inlet openings 3 nor can move from one chamber through the associated rake into the adjacent chamber.

The upper housing portion 2*b* of the housing 2 is provided with a mechanical interface 15 for fixing a handle (not shown) provided with a corresponding mechanical interface. The interface 15 comprises a groove adapted to be engaged by elastically resilient legs having cam members at their ends and being part of a handle (not shown). Such a handle can be removed from the filter cartridge 1 once the latter one is inserted into the water tank. For removing the filter cartridge 1 from the water tank, the handle is engaged from the top to the mechanical interface 15 and fixed thereto by exerting a light downward pressure, whereby the cams of the legs snap into the grooves of the interface 15. Thereafter, the filter cartridge 1 can easily be pulled out of the water tank.

Preferably, the filter cartridge 1 is designed as a disposable unit. However, if the upper housing portion 2*b* is releasable fixed to the lower housing portion 2*a*, it is possible to exchange the exhausted ion exchange resin granules; in this way, the filter cartridge can be used several times. Another possibility would be to regenerate the exhausted ion exchange resin granules.

The filter cartridge according to the invention requires but a relatively small space. However, by the provision of the baffle members of the kind shown in the drawings and described herein above, the water has to flow along a relatively long path from the inlets 3 through the ion exchange resin to the central outlet 4. Thus, the dwell time of the water in the interior of the filter cartridge is increased and the efficiency improved. The low height of the filter cartridge has the advantage that it is usually fully immersed in the water contained in the water tank and, thereby, entirely filled with water. This is particularly advantageous, also as far as hygienic considerations are concerned, when compared to filter cartridges according to the prior art, some of which extending over the entire height of the water tank and thereby are not fully immersed in the water most of the time. Moreover, formation of beds and so-called bed compacting are avoided to a high degree, and the usable interior volume of a water tank is not decreased to a noteworthy degree. The filter cartridge according to the invention has the further advantage that it is of simple design and can be manufactured at low costs. Particularly, the filling with ion exchange resin is very easy because the filling process can take place prior to fixing the upper housing portion 2*b* to the lower housing portion 2*a*.

What is claimed is:

1. A filter cartridge for a water tank of a coffee machine, comprising:
   a housing containing a filter medium and having at least one inlet located at the bottom of said filter cartridge and an outlet located at the bottom of said filter cartridge;
   a plurality of spaced apart baffle members located in the interior of said housing and adapted to increase the length of the flow path of the water between said at least one inlet and said outlet;
   said housing including a lower housing portion and an upper housing portion mounted to said lower housing portion, said baffle members being fixed alternately to said upper housing portion and said lower housing portion and extend essentially in a vertical direction;
   said upper housing portion having water permeable barrier members extending therefrom toward the upper edges of the baffle members fixed to said lower housing portion; and
   a first number of water flow passages between said upper housing portion and said baffle members fixed to said lower housing portion as well as a second number of water flow passages between said lower housing portion and said baffle members fixed to said upper housing portion.

2. A filter cartridge according to claim 1 in which said filter cartridge contains a granular filter medium, said inlet being constituted by a number of slot shaped openings each having a width that is less than the statistic mean exterior diameter of a filter medium granule.

3. A filter cartridge according to claim 1 in which said filter cartridge is provided with one central water outlet and two lateral water inlets.

4. A filter cartridge according to claim 3 in which at least three vertically extending baffle members are provided between one of said water inlets and said central water outlet.

5. A filter cartridge according to claim 1 in which the interior of the side walls of said lower housing portion are provided with grooves engaged by said baffle members fixed to said upper housing portion.

6. A filter cartridge according to claim 1 in which said filter cartridge is filled with a filter medium from the bottom up to the upper edge of said baffle members fixed to said lower housing portion.

7. A filter cartridge according to claim 6 in which said filter cartridge contains a granular filter medium, said inlet being constituted by a number of slot shaped openings each having a width that is less than the statistic mean exterior diameter of a filter medium granule.

8. A filter cartridge according to claim 1 in which said outlet is provided with a porous filter member.

9. A filter cartridge according to claim 1 in which said upper housing portion is provided with a mechanical interface adapted to receive a handle provided with a corresponding mechanical interface.

10. A filter cartridge according to claim 7, wherein said number of slot shaped openings each have a width that is less than x minus σ, where x is the arithmetic mean value of the granule diameter and σ is the standard deviation.

11. A filter cartridge according to claim 2, wherein said number of slot shaped openings each have a width that is less than x minus σ, where x is the arithmetic mean value of the granule diameter and σ is the standard deviation.

12. A filter cartridge according to claim 6, wherein each of said barrier members includes a rake defining gaps sized to prevent passage of said filter medium while permitting passage of water therethrough.

13. A filter cartridge according to claim 12 in which said filter medium is a granular filter medium, and said gaps in said rake of each of said barrier members has a width that is less than the statistic mean exterior diameter of a filter medium granule.

14. A filter cartridge for a water tank of a coffee machine, comprising:
- a housing containing a filter medium and having at least one inlet located at the bottom of said filter cartridge and an outlet located at the bottom of said filter cartridge;
- a plurality of spaced apart baffle members located in the interior of said housing and adapted to increase the length of the flow path of the water between said at least one inlet and said outlet;
- said housing including a lower housing portion and an upper housing portion mounted to said lower housing portion, said baffle members being fixed alternately to said upper housing portion and said lower housing portion and extend essentially in a vertical direction;
- the interior of side walls of said lower housing portion being provided with grooves engaged by said baffle members fixed to said upper housing portion; and
- a first number of water flow passages between said upper housing portion and said baffle members fixed to said lower housing portion as well as a second number of water flow passages between said lower housing portion and said baffle members fixed to said upper housing portion.

15. A filter cartridge according to claim 14 in which said upper housing portion is provided with water permeable barrier members extending toward the upper edges of the baffle members fixed to said lower housing portion.

16. A filter cartridge according to claim 14 in which said filter cartridge is filled with a filter medium from the bottom up to the upper edge of said baffle members fixed to said lower housing portion.

17. A filter cartridge according to claim 16 in which said filter cartridge contains a granular filter medium, said inlet being constituted by a number of slot shaped openings each having a width that is less than the statistic mean exterior diameter of a filter medium granule.

18. A filter cartridge according to claim 14 in which said outlet is provided with a porous filter member.

* * * * *